United States Patent
Im et al.

(10) Patent No.: US 12,250,134 B2
(45) Date of Patent: *Mar. 11, 2025

(54) METHOD AND APPARATUS FOR SPLITTING DATA IN MULTI-CONNECTIVITY

(71) Applicant: SAMSUNG ELECTRONICS CO., LTD., Suwon-si (KR)

(72) Inventors: Hee-su Im, Hwaseong-si (KR); Byung-seung Kim, Seongnam-si (KR); Eun-jun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

This patent is subject to a terminal disclaimer.

(21) Appl. No.: 17/826,456

(22) Filed: May 27, 2022

(65) Prior Publication Data

US 2022/0286374 A1 Sep. 8, 2022

Related U.S. Application Data

(63) Continuation of application No. 16/445,813, filed on Jun. 19, 2019, now Pat. No. 11,349,739.

(30) Foreign Application Priority Data

Oct. 16, 2018 (KR) .................. 10-2018-0123273

(51) Int. Cl.
*H04L 43/0864* (2022.01)
*H04W 24/08* (2009.01)
(Continued)

(52) U.S. Cl.
CPC ......... *H04L 43/0864* (2013.01); *H04W 24/08* (2013.01); *H04W 84/042* (2013.01); *H04W 88/06* (2013.01)

(58) Field of Classification Search
CPC ............. H04L 43/0864; H04L 43/0847; H04L 47/365; H04L 1/1812; H04L 47/27;
(Continued)

(56) References Cited

U.S. PATENT DOCUMENTS 9,572,185 B2 2/2017 Sivanesan et al.
9,838,282 B2 12/2017 Dudda et al.
(Continued)

FOREIGN PATENT DOCUMENTS

CN 103959875 A 7/2014
CN 104170341 A 11/2014
(Continued)

OTHER PUBLICATIONS

Search Report, dated Jan. 4, 2023, issued by the Intellectual Property Office of Singapore, Application No. 10201907824R.
(Continued)

*Primary Examiner* — Kwang B Yao
*Assistant Examiner* — Syed M Bokhari
(74) *Attorney, Agent, or Firm* — Sughrue Mion, PLLC

(57) ABSTRACT

A method for multi-connectivity between a plurality of base stations and user equipment includes estimating, at the user equipment, a first round trip time (RTT) taken in transmitting first data to a first base station, estimating, at the user equipment, a second RTT taken in transmitting second data to a second base station, and determining a size of the first data which is to be transmitted to the first base station, based on the first RTT and the second RTT.

20 Claims, 12 Drawing Sheets

(51) Int. Cl.
*H04W 84/04* (2009.01)
*H04W 88/06* (2009.01)

(58) Field of Classification Search
CPC .. H04L 47/283; H04W 24/08; H04W 84/042; H04W 88/06; H04W 24/02; H04W 76/15; H04W 28/0231
USPC ........................................................ 370/252
See application file for complete search history.

(56) References Cited

U.S. PATENT DOCUMENTS

| | | | |
|---|---|---|---|
| 10,314,032 B2 | 6/2019 | Yang et al. | |
| 11,432,223 B2 | 8/2022 | Virtej et al. | |
| 2005/0157696 A1* | 7/2005 | Yamamoto | H04L 1/0019 370/349 |
| 2010/0302968 A1 | 12/2010 | Lu et al. | |
| 2011/0113299 A1 | 5/2011 | Power et al. | |
| 2011/0202641 A1 | 8/2011 | Kahn et al. | |
| 2013/0039208 A1 | 2/2013 | Jonsson et al. | |
| 2014/0293899 A1 | 10/2014 | Ko et al. | |
| 2015/0033084 A1 | 1/2015 | Sasturkar et al. | |
| 2015/0189551 A1 | 7/2015 | Ozturk et al. | |
| 2016/0119840 A1 | 4/2016 | Loehr et al. | |
| 2016/0183290 A1 | 6/2016 | Ko et al. | |
| 2016/0205586 A1 | 7/2016 | Kim et al. | |
| 2016/0205681 A1 | 7/2016 | Kim et al. | |
| 2016/0226708 A1 | 8/2016 | Maheshwari et al. | |
| 2017/0070940 A1* | 3/2017 | Handa | H04W 72/0453 |
| 2017/0164363 A1 | 6/2017 | Zhang et al. | |
| 2017/0188248 A1 | 6/2017 | Muller et al. | |
| 2018/0091278 A1 | 3/2018 | Kanamarlapudi et al. | |
| 2018/0279262 A1 | 9/2018 | Babaei et al. | |
| 2019/0007946 A1 | 1/2019 | Yerramalli et al. | |
| 2019/0069197 A1 | 2/2019 | Takeda et al. | |
| 2019/0159147 A1* | 5/2019 | Ryu | H04W 72/0446 |
| 2019/0190806 A1* | 6/2019 | Bhushan | H04W 72/0453 |
| 2020/0099561 A1 | 3/2020 | Lee et al. | |
| 2020/0112867 A1 | 4/2020 | Opshaug et al. | |
| 2020/0177318 A1* | 6/2020 | Belleschi | H04W 72/53 |

FOREIGN PATENT DOCUMENTS

| | | |
|---|---|---|
| CN | 107852660 A | 3/2018 |
| EP | 2408152 A1 | 1/2012 |
| JP | 4924285 B2 | 4/2012 |
| KR | 10-2014-0061109 A | 5/2014 |
| KR | 10-1425300 B1 | 7/2014 |
| KR | 10-2015-0016473 A | 2/2015 |
| KR | 10-1598621 B1 | 3/2016 |
| KR | 10-2017-0005454 A | 1/2017 |
| KR | 10-2017-0050024 A | 5/2017 |
| KR | 10-2017-0095354 A | 8/2017 |
| KR | 10-2017-0142513 A | 12/2017 |
| KR | 10-2018-0081436 A | 7/2018 |
| TW | 201132146 A1 | 9/2011 |
| WO | 2015/199411 A1 | 12/2015 |
| WO | 2017-140361 A1 | 8/2017 |
| WO | 2017-164141 A1 | 9/2017 |

OTHER PUBLICATIONS

Office Action dated Nov. 28, 2023, issued by Chinese Patent Office in Chinese Patent Application No. 201910567705.4.
Communication issued by the Taiwan Intellectual Property Office on Aug. 18, 2022 for TW Patent Application No. 108125810.
Frank Kelly et al., "Stability of End-to-End Algorithms for Joint Routing and Rate Control", Computer Communication Review, vol. 35, No. 2, ACM SIGCOMM, Apr. 2005, pp. 5-12.
"3rd Generation Partnership Project; Technical Specification Group Radio Access Network; NR; Packet Data Convergence Protocol (PDCP) specification (release 15)", 3GPP TS 38.323 V15.2.0 (Jun. 2018), Telecommunications Technology Association, 27 pages.
Office Action issued May 23, 2023 by the Korean Patent Office in corresponding KR Patent Application No. 10-2018-0123273.
India Office Action, dated Oct. 31, 2022 issued by Intellectual Property India in App No. 201934041358.
Communication issued on Aug. 22, 2024 by the China National Intellectual Property Administration for Chinese Patent Application No. 201910567705.4.
Communication dated Jul. 12, 2024, issued by the German Patent and Trademark Office in German Application No. 102019115114.7.

* cited by examiner

METHOD AND APPARATUS FOR SPLITTING DATA IN MULTI-CONNECTIVITY

CROSS-REFERENCE TO RELATED APPLICATION

This is a continuation application of U.S. application Ser. No. 16/445,813, filed Jun. 16, 2019, which claims priority to Korean Patent Application No. 10-2018-0123273, filed on Oct. 16, 2018, in the Korean Intellectual Property Office, the disclosure of which is incorporated herein in its entirety by reference.

BACKGROUND

The inventive concept relates to wireless communication, and more particularly, to a method and an apparatus for splitting data in multi-connectivity.

In wireless communication between a user equipment and a base station, various techniques may be used to transmit a larger amount of data at a higher speed. For example, multi-connectivity may denote a process where one user equipment communicates with two or more base stations. In multi-connectivity, data may be transmitted and/or received through a plurality of channels between user equipment and two or more base stations, and thus, data throughput may increase and communication quality may be prevented from being degraded due to a poor quality channel. In order to increase the efficiency of multi-connectivity, it is desirable to efficiently distribute transmission data to a plurality of channels.

SUMMARY

The inventive concept provides a method and an apparatus for efficiently splitting data in multi-connectivity.

According to an aspect of the inventive concept, there is provided a method for multi-connectivity between a plurality of base stations and user equipment, the method including estimating, at the user equipment, a first round trip time (RTT) taken in transmitting first data to a first base station, estimating, at the user equipment, a second RTT taken in transmitting second data to a second base station, and determining, at the user equipment, a size of the first data which is to be transmitted to the first base station, based on the first RTT and the second RTT.

According to another aspect of the inventive concept, there is provided a method for multi-connectivity between a plurality of base stations and user equipment, the method including estimating, at a first base station, a first RTT taken in transmitting first data from the first base station to the user equipment, obtaining, at the first base station, a second RTT taken in transmitting second data from a second base station to the user equipment, and determining, at the first base station, a size of the first data which is to be transmitted from the first base station to the user equipment, based on the first RTT and the second RTT.

According to another aspect of the inventive concept, there is provided a method for multi-connectivity between a plurality of base stations and user equipment, the method including estimating a plurality of round trip times (RTTs) taken in transmitting data through a plurality of channels between the plurality of base stations and the user equipment, obtaining respective channel bandwidths of the plurality of channels, and determining sizes of pieces of split data to be transmitted through the plurality of channels, based on the plurality of RTTs and the channel bandwidths.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
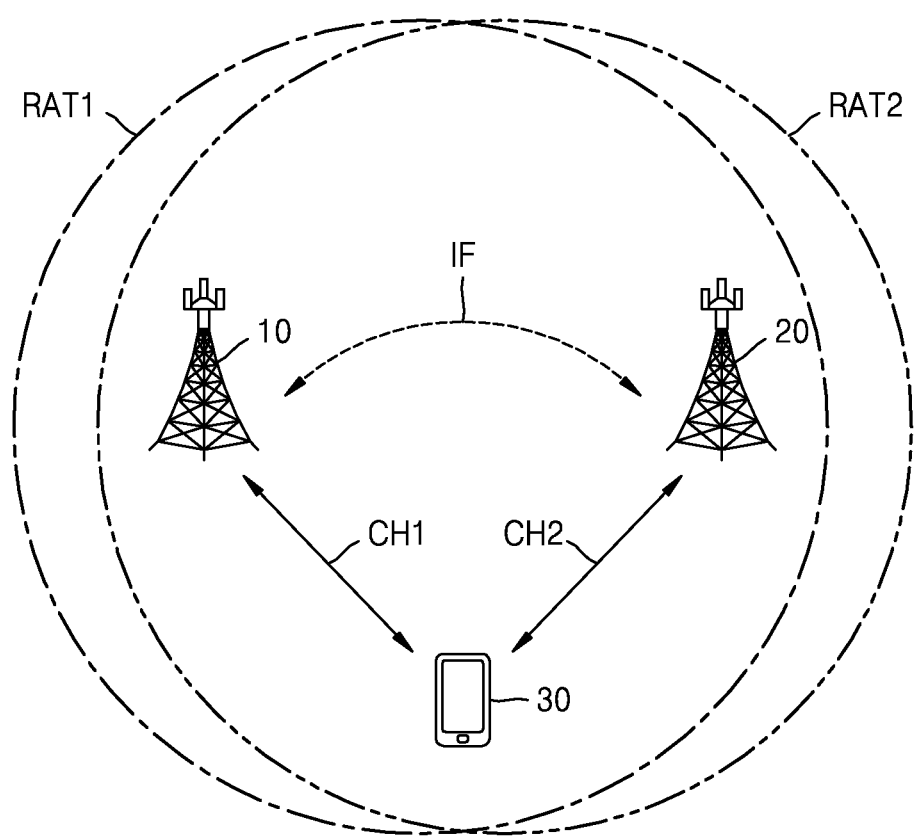
FIG. 1 is a diagram illustrating multi-connectivity according to an exemplary embodiment.

FIG. 1 is a diagram illustrating multi-connectivity according to an exemplary embodiment. In detail, FIG. 1 is a diagram illustrating a plurality of wireless communication systems including a first wireless communication system RAT1 and a second wireless communication system RAT2 each including user equipment (UE) 30 and a plurality of base stations including a first base station 10 and a second base station 20.

In a non-limiting embodiment, each of the first and second wireless communication systems RAT1 and RAT2 may be a $5^{th}$ generation (5G) system, a 5G new radio (5G NR) system, a long term evolution (LTE) system, a code division multiple access (CDMA) system, a global system for mobile communications (GSM) system, a wireless local area network (WLAN) system, or another arbitrary wireless communication system. Herein, a wireless communication system may be referred to as radio access technology (RAT).

The first and second base stations 10 and 20 may communicate with the UE 30, based on multi-connectivity. For example, as illustrated in FIG. 1, the UE 30 and the first base station 10 may establish a first channel CH1 therebetween according to the first wireless communication system RAT1 and may communicate with each other through the first channel CH1. The UE 30 and the second base station 20 may establish a second channel CH2 therebetween according to the second wireless communication system RAT2 and may communicate with each other through the second channel CH2. In some embodiments, the first wireless communication system RAT1 may be the same as the second wireless communication system RAT2. In some other embodiments, the first wireless communication system RAT1 may differ from the second wireless communication system RAT2. Hereinafter, in exemplary embodiments, an example where the first wireless communication system RAT1 is a 5G NR system (i.e., the first base station 10 is a 5G NR base station) and the second wireless communication system RAT2 is an LTE system (i.e., the second base station 20 is an LTE base station) will be mainly described. However, it should be understood that exemplary embodiments are not limited thereto.

A base station (for example, the first base station 10 and/or the second base station 20) may denote a fixed station and may communicate with the UE 30 and/or another base station to exchange data and control information. For example, a base station may be referred to as a node B, an evolved node B (eNB), a next generation node B (gNB), a sector, a site, a base transceiver system (BTS), an access point (AP), a relay node, a remote radio head (RRH), a radio unit (RU), or a small cell. Herein, a base station or a cell may be construed as a comprehensive meaning representing a function performed or a certain area covered by a base station controller (BSC) in CDMA, a node B in WCDMA, an eNB in LTE, or a gNB or a sector (a site) in 5G NR, and may cover various coverage areas such as a mega cell, a micro cell, a pico cell, a femto cell, a relay node, an RRH, an RU, and a small cell communication range.

The UE 30 may be a wireless communication device and may be fixed or mobile. Also, the UE 30 may denote various devices which communicate with a base station to transmit or receive data and/or control information. For example, the UE 30 may be referred to as terminal equipment, a mobile station (MS), a user terminal (UT), a subscriber station (SS), a wireless device, or a handheld device. Also, the UE 30 may support multi-connectivity, and thus, as illustrated in FIG. 1, the UE 30 may be connected to two or more base stations, for example, the first and second base stations 10 and 20. Particularly, as illustrated in FIG. 1, one UE 30 being connected to two base stations, for example, the first and second base stations 10 and 20, may be referred to as dual connectivity. Hereinafter, in exemplary embodiments, dual connectivity will be mainly described, but it should be understood that exemplary embodiments are applied to multi-connectivity where the UE 30 communicates with three or more base stations.

A wireless communication network between the first and second base stations 10 and 20 and the UE 30 may share available network resources, and thus, may support a plurality of users. For example, information may be transferred over the wireless communication network by using various multiple access schemes such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. The first base station 10 may communicate with the second base station 20 through an interface IF. In some embodiments, the first base station 10 may access the second base station 20 through an X2 interface. In some other embodiments, as described below with reference to FIG. 12, the first base station 10 may access the second base station 20 over a core network.

In multi-connectivity, data may be split and transmitted, and split portions (e.g., first and second data) of the data may be transmitted through the first channel CH1 and the second channel CH2, respectively. For example, in a downlink, the first and second base stations 10 and 20 may respectively transmit the first and second data, obtained by splitting data which is to be transmitted to the UE 30, to the UE 30 through the first and second channels CH1 and CH2. Also, in an uplink, the UE 30 may split data, which is to be transmitted, into the first and second data and may respectively transmit the first and second data to the first and second base stations 10 and 20 through the first and second channels CH1 and CH2. Hereinafter, according to exemplary embodiments, as described below with reference to the drawings, the UE 30 and the first and second base stations 10 and 20 may efficiently split data, based on a state of each of the first and second channels CH1 and CH2. Accordingly, delay due to reordering of data may be reduced, and improved quality of experience (QoE) may be provided to a user of the UE 30.

Figure 2:
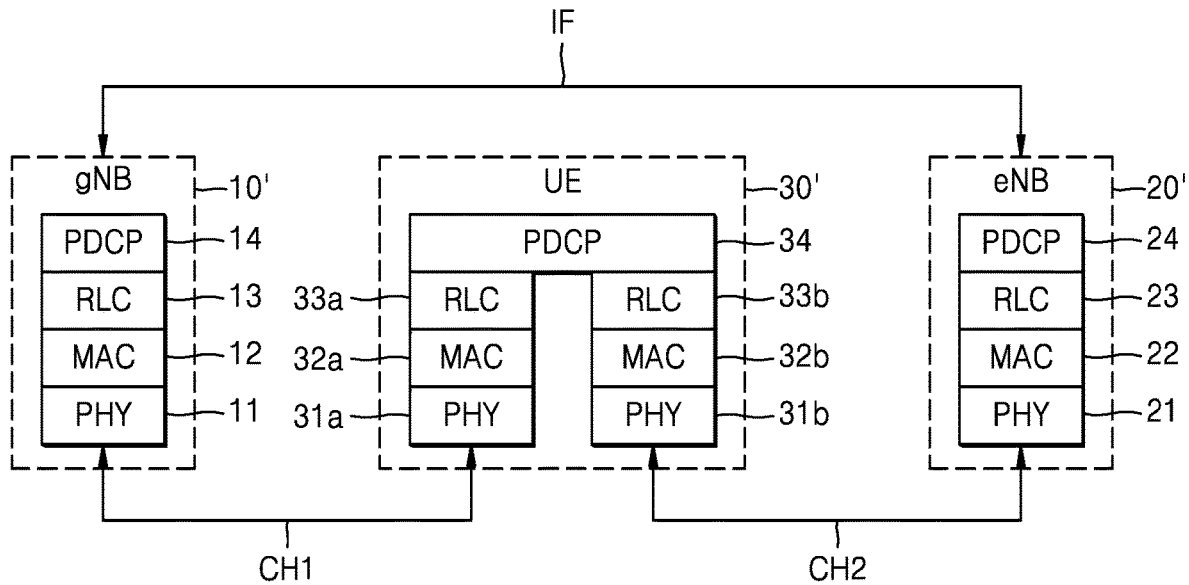
FIG. 2 is a diagram illustrating a structure of a wireless protocol in multi-connectivity of FIG. 1, according to an exemplary embodiment.

FIG. 2 is a diagram illustrating a structure of a wireless protocol in multi-connectivity of FIG. 1, according to an exemplary embodiment.

As described above with reference to FIG. 1, UE 30' may access a first base station 10' and a second base station 20'. In FIG. 2, it may be assumed that the first base station 10' is a base station (for example, gNB) of a 5G NR system, and the base station 20' is a base station (for example, eNB) of an LTE system. As illustrated in FIG. 2, the UE 30' (or a packet data convergence protocol (PDCP) of the UE 30') may support a wireless protocol of the first wireless communication system RAT1 (for example, the 5G NR system) and a wireless protocol of the second wireless communication system RAT2 (for example, the LTE system). Hereinafter, FIG. 2 will be described with reference to FIG. 1.

Referring to FIG. 2, in each of the first base station 10' and the UE 30', the wireless protocol of the first wireless communication system RAT1 may include physical (PHY) layers 11 and 31a, medium access controls (MACs) 12 and 32a, radio link controls (RLCs) 13 and 33a, and PDCPs 14 and 34. Each of the PHY layers 11 and 31a, the MACs 12 and 32a, the RLCs 13 and 33a, and the PDCPs 14 and 34 may perform unique functions thereof, based on prescription by the first wireless communication system RAT1. For example, the PHY layers 11 and 31a may encode and modulate data of the MACs 12 and 32a, generate an OFDM symbol to transmit the generated OFDM symbol to the first channel CH1, demodulate and decode an OFDM symbol received through the first channel CH1, and transfer data to the MAC 12 and 32a. The MACs 12 and 32a may perform functions including hybrid automatic repeat request (HARQ) retransmission, the RLC 13 and 33a may perform functions including automatic repeat request (ARQ), and the PDCPs 14 and 34 may perform functions including reordering.

In each of the second base station 20' and the UE 30', the wireless protocol of the second wireless communication system RAT2 may include PHY layers 21 and 31b, MACs 22 and 32b, RLCs 23 and 33b, and PDCPs 24 and 34. Each of the PHY layers 21 and 31b, the MACs 22 and 32b, the RLCs 23 and 33b, and the PDCPs 24 and 34 may perform unique functions thereof, based on prescription by the second wireless communication system RAT2. For example, the PHY layers 21 and 31b may encode and modulate data of the MACs 22 and 32b, generate an OFDM symbol to transmit the generated OFDM symbol to the second channel CH2, demodulate and decode an OFDM symbol received through the second channel CH2, and transfer data to the MACs 22 and 32b. The MACs 22 and 32b may perform functions including HARQ retransmission, the RLCs 23 and 33b may perform functions including ARQ, and the PDCPs 24 and 34 may perform functions including reordering.

The PDCP 34 may include a split bearer in dual connectivity. The split bearer may distribute a data packet to a plurality of different RLC entities in one PDCP to transmit data through a plurality of channels, and thus, may denote a data radio bearer (DRB) for enhancing a data transmission rate. For example, in the uplink, the PDCP 34 may process data packets (or PDCP service data units (SDUs)) into PDCP protocol data units (PDUs) and may transfer the PDCP PDUs to two RLC entities 33a and 33b. Here, when the PDCP PDUs transferred to the two RLC entities 33a and 33b are not appropriately distributed, namely, when a size of split data is not appropriately determined, delay due to reordering may increase in the PDCP 34. When the delay due to the reordering increases, delay may occur in an upper layer (for example, an application layer (for example, 35 of FIG. 3)) of the PDCP 34, causing the degradation in user QoE of the UE 30'. Also, a problem similar to the above-described problem may occur in the downlink.

Figure 3:
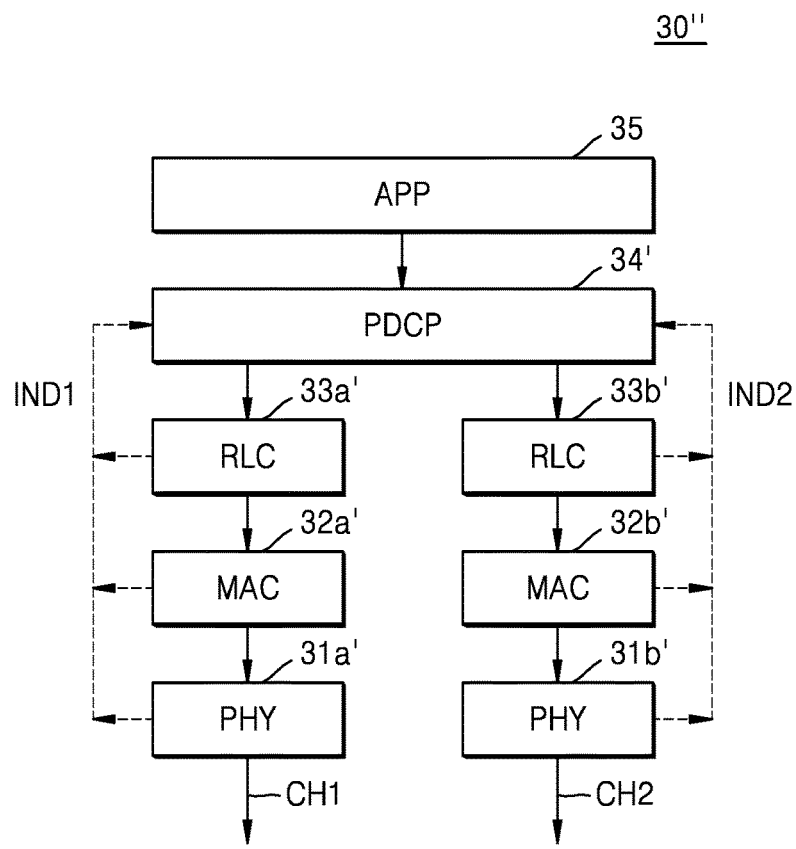
FIG. 3 is a diagram illustrating a structure of a wireless protocol in user equipment according to an exemplary embodiment.

FIG. 3 is a diagram illustrating a structure of a wireless protocol in UE 30" according to an exemplary embodiment. In detail, FIG. 3 illustrates a structure of a wireless protocol in the uplink. Hereinafter, FIG. 3 will be described with reference to FIG. 1, and in describing FIG. 3, the same or similar description to those previously provided with reference to FIG. 2 will be omitted.

Referring to FIG. 3, the wireless protocol may include a first PHY layer 31a', a first MAC 32a', and a first RLC 33a' for the first wireless communication system RAT1 and may include a second PHY layer 31b', a second MAC 32b', and a second RLC 33b' for the second wireless communication system RAT2, and a PDCP 34' may support the first wireless communication system RAT1 and the second wireless communication system RAT2. Also, an application 35 corresponding to an upper layer of the PDCP 34' may provide the PDCP 34' with a data packet which is to be transmitted through the uplink.

The PDCP 34', as described above with reference to FIG. 2, may determine data (e.g., sizes of first data and second data) which is to be transmitted through the first channel CH1 and the second channel CH2 in multi-connectivity, and thus, may split the data packet provided from the application 35 and may respectively provide pieces of split data to the first RLC (or a first RLC entity) 33a' and the second RLC (or a second RLC entity) 33b'. For example, according to the NR PDCP standard (3GPP TS 38.323 V15.2.0, 2018-06) published recently, a means for minimizing PDCP reordering delay caused by a data splitting operation performed by the UE 30" is defined as a capability of the UE 30".

In some embodiments, the PDCP 34' may be provided with a plurality of indicators from lower layers and may distribute data to the first RLC 33a' and the second RLC 33b', based on the plurality of indicators. For example, as illustrated in FIG. 3, the PDCP 34' may be provided with first indicators IND1 from the first PHY layer 31a', the first MAC 32a' and the first RLC 33a' and may be provided with second indicators IND2 from the second PHY layer 31b' the second MAC 32b' and the second RLC 33b'. The PDCP 34' may detect states of the first channel CH1 and the second channel CH2 based on the first indicators IND1 and the second indicators IND2, and may distribute data to the first RLC 33a', and the second RLC 33b' based on the states of the first channel CH1 and the second channel CH2. An exemplary operation of the PDCP 34' will be described below with reference to FIG. 4.

Figure 4:
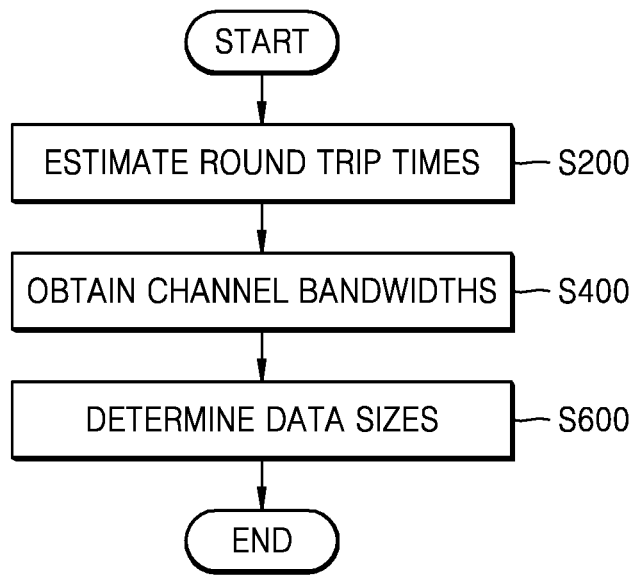
FIG. 4 is a flowchart illustrating a method for multi-connectivity according to an exemplary embodiment.

FIG. 4 is a flowchart illustrating a method for multi-connectivity according to an exemplary embodiment. For example, the method of FIG. 4 may be performed by the PDCP 34' of FIG. 3, and as described below with reference to FIG. 5, may be triggered by various factors. Hereinafter, FIG. 4 will be described with reference to FIGS. 1 and 3.

Referring to FIG. 4, in operation S200, an operation of estimating round trip times may be performed. A round trip time (RTT) may be defined as a time taken for a transmitting side to transmit data to a receiving side and receive a response (for example, an acknowledge response (ACK)) to the transmitted data from the receiving side. A document "Stability of end-to-end algorithms for joint routing and rate control" (F. Kelly and T. Voice, ACM SIGCOMM CCR, 35, 2005) has proposed a method for maximizing network efficiency in a transmission control protocol (TCP), and the proposed method may be expressed as the following Equation (1). A transmitting side may change a congestion window "cwnd" of a corresponding path by $\Delta w_p$ of the following Equation (1):

$$\Delta w_p = \frac{\max_{i \in P}\left(\frac{w_i}{RTT_i^2}\right)}{\Sigma_{i \in P}\left(\frac{w_i}{RTT_i}\right)^2} \tag{1}$$

In Equation (1), P may denote a total set of paths formed by a single host, $w_i$ may denote a current transmission window of an $i^{th}$ path, and $RTT_i$ may denote a round trip time of the $i^{th}$ path. In some embodiments, in multi-connectivity, splitting of data may be performed based on a change in a transmission window provided in Equation (1). In the TCP, a round trip time may be determined based on traffic of a network, and thus, the transmitting side may measure, as the round trip time, a difference between a time when data is transmitted and a time when ACK is received. On the other hand, in multi-connectivity, a round trip time may depend on a state of a channel and may be estimated as described below.

In order to apply Equation (1) to multi-connectivity illustrated in FIG. 1, a first round trip time $RTT_1$ and a second round trip time $RTT_2$ respectively corresponding to the first channel CH1 and the second channel CH2 may be estimated. For example, as described above with reference to FIG. 3, the PDCP 34' of the UE 30" may estimate the first round trip time $RTT_1$ based on the first indicators ID1 provided from lower layers, and may estimate the second round trip time $RTT_2$ based on the second indicators ID2 provided from lower layers. An example of operation S200 will be described below with reference to FIG. 6.

In operation S400, an operation of obtaining channel bandwidths may be performed. As illustrated in FIG. 1, in multi-connectivity where the UE 30 communicates with the first and second base stations 10 and 20, the UE 30 and one base station (for example, the first base station 10 or the second base station 20) may be regarded as a 1-hop network, and $w_i$ of Equation (1) may be expressed as a multiplication of a channel bandwidth and a round trip time as in the following Equation (2):

$$w_i = BW_i \times RTT_i \tag{2}$$

Therefore, in Equation (1), $w_i$ may be replaced with "$BW_i \times RTT_i$", and in operation S400, an operation of obtaining channel bandwidths (i.e., a first channel bandwidth $BW_1$ of the first channel CH1 and a second channel bandwidth $BW_2$ of the second channel CH2) may be performed. For example, the first PHY layer 31a' and the second PHY layer 31b' may respectively measure the first channel bandwidth $BW_1$ and the second channel bandwidth $BW_2$, the PDCP 34' may obtain the first channel bandwidth $BW_1$, based on an indicator provided from the first PHY layer 31a' among the first indicators IND1 and may obtain the second channel bandwidth $BW_2$, based on an indicator provided from the second PHY layer 31b' among the second indicators IND2.

In operation S600, an operation of determining sizes of pieces of split data (e.g., first and second data) may be performed. When the first channel bandwidth $BW_1$ and the second channel bandwidth $BW_2$ respectively correspond to channel bandwidths of the first channel CH1 and the second channel CH2, Equation (1) may be expressed as the following Equation (3) in multi-connectivity illustrated in FIG. 1:

$$\Delta w = \frac{\max\left(\frac{BW_1}{RTT_1}, \frac{BW_2}{RTT_2}\right)}{(BW_1 + BW_2)^2} \quad (2)$$

Moreover, in multi-connectivity based on M (where M is an integer greater than one) number of channels, Equation (1) may be expressed as the following Equation (4):

$$\Delta w = \frac{\max\limits_{1 \le i \le M} \frac{BW_i}{RTT_i}}{\left(\sum\limits_{i=1}^{M} BW_i\right)^2} \quad (4)$$

The first round trip time $RTT_1$ and the second round trip time $RTT_2$ may be estimated in operation S200, and the first channel bandwidth $BW_1$ and the second channel bandwidth $BW_2$ may be obtained in operation S400. Therefore, in operation S600, the PDCP 34' may calculate a variation (i.e., $\Delta w$) of data size, based on Equation (3) and may reflect the variation $\Delta w$ in splitting the data packet to be transmitted. An example of operation S600 will be described below with reference to FIG. 8.

Figure 5:
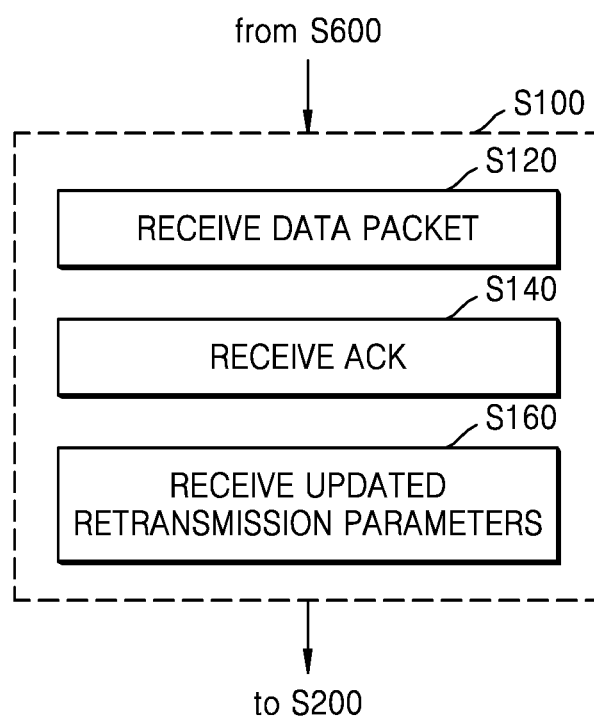
FIG. 5 is a flowchart illustrating a method for multi-connectivity according to an exemplary embodiment.

FIG. 5 is a flowchart illustrating a method for multi-connectivity according to an exemplary embodiment. In detail, performing of the method for multi-connectivity described above with reference to FIG. 4 may be triggered in operation S100 of FIG. 5, and after operation S100 is performed, operation S200 of FIG. 4 may be subsequently performed. Also, after operation S600 of FIG. 4 is performed, operation S100 of FIG. 5 may be performed. As illustrated in FIG. 5, operation S100 may include operations S120, S140, and S160. In some embodiments, when at least one of operations S120, S140, and S160 of operation S100 is performed, the method may proceed to operation S200. In some other embodiments, operation S100 may include only some of operations S120, S140, and S160. Hereinafter, FIG. 5 will be described with reference to FIG. 3.

In operation S120, an operation of receiving a data packet may be performed. For example, when the data packet is received from the application 35 corresponding to the upper layer, the PDCP 34' may trigger the method of FIG. 4. The data packet received from the application 35 may be data which is to be transmitted by the application 35 through wireless communication and may be referred to as a PDCP SDU, and in some embodiments, the data packet may include a header and a payload.

In operation S140, an operation of receiving ACK may be performed. For example, when the ACK corresponding to an RLC PDU in an RLC acknowledge mode (AM) is received, the PDCP 34' may trigger the method of FIG. 4. In some embodiments, when a predefined number of ACKs are received, the PDCP 34' may trigger the method of FIG. 4. Also, in some embodiments, as described below with reference to Equation (8), the PDCP 34' may trigger the method of FIG. 4, based on a predefined period or another factor, and in this case, the number of received ACKs may be used.

In operation S160, an operation of receiving updated retransmission parameters may be performed. As described below with reference to FIG. 6, round trip times may be estimated based on retransmission in operation S200 of FIG. 4. A wireless communication system may prescribe values of retransmission parameters, some wireless communication systems (for example, the 5G NR system) may prescribe the values of the retransmission parameters to vary, and a base station may update the retransmission parameters, based on a channel state. When the values of the retransmission parameters vary, the estimated round trip times may vary, and thus, when updated retransmission parameters are received from the base station, the PDCP 34' may trigger the method of FIG. 4.

Figure 6:
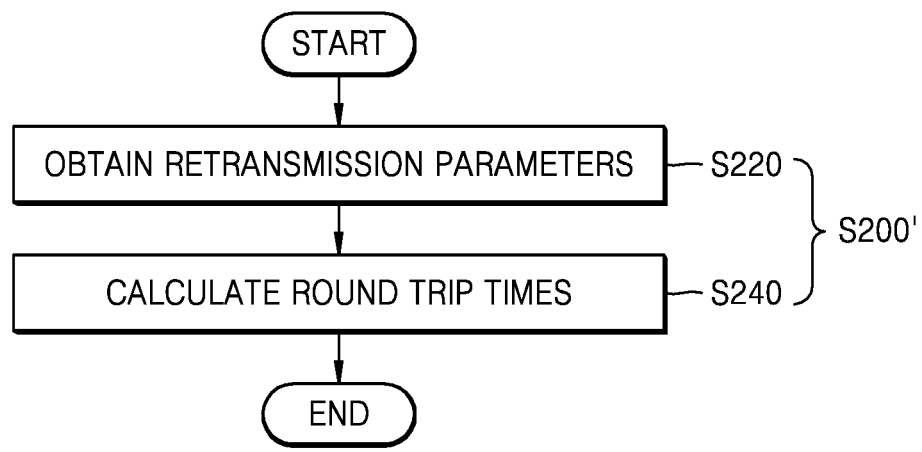
FIG. 6 is a flowchart illustrating operation S200 of FIG. 4, according to an exemplary embodiment.

FIG. 6 is a flowchart illustrating operation S200 of FIG. 4, according to an exemplary embodiment. As described above with reference to FIG. 4, an operation of estimating round trip times may be performed in operation S200' of FIG. 6. In detail, one round trip time corresponding to one channel may be estimated in operation S200' of FIG. 6, and operation S200' of FIG. 6 may be performed sequentially or in parallel a plurality of times, based on a plurality of channels. As illustrated in FIG. 6, operation S200' may include operation S220 and operation S240. Hereinafter, FIG. 6 will be described with reference to FIGS. 1 and 3, and an example which estimates the first round trip time $RTT_1$ corresponding to the first channel CH1 will be described based on the assumption that the UE 30 of FIG. 1 is the UE 30" of FIG. 3.

In operation S220, an operation of obtaining retransmission parameters may be performed. For example, the PDCP 34' may be provided with the first indicators IND1, including first retransmission parameters, provided from the first base station 10. In some embodiments, the PDCP 34' may reflect HARQ retransmission in estimating the first round trip time $RTT_1$, and for example, the first retransmission parameters may include a retransmission period $c_1$ and a maximum retransmission number $N_1$. In some other embodiments, the PDCP 34' may reflect RLC retransmission in estimating the first round trip time $RTT_1$, and for example, the first retransmission parameters may include an RLC maximum retransmission number $R_1$.

In operation S240, an operation of calculating a round trip time may be performed. For example, the PDCP 34' may calculate the first round trip time $RTT_1$ used to calculate the variation $\Delta w$ of data size in Equation (3), based on the retransmission parameters which are obtained in operation S220. In some embodiments, the PDCP 34' may calculate a round trip time including HARQ retransmission provided by the first MAC 32a'. In some embodiments, the PDCP 34' may calculate a round trip time further including RLC retransmission provided by the first RLC 33a'. Examples of operation S240 will be described below with reference to FIGS. 7A and 7B.

Figure 7A:
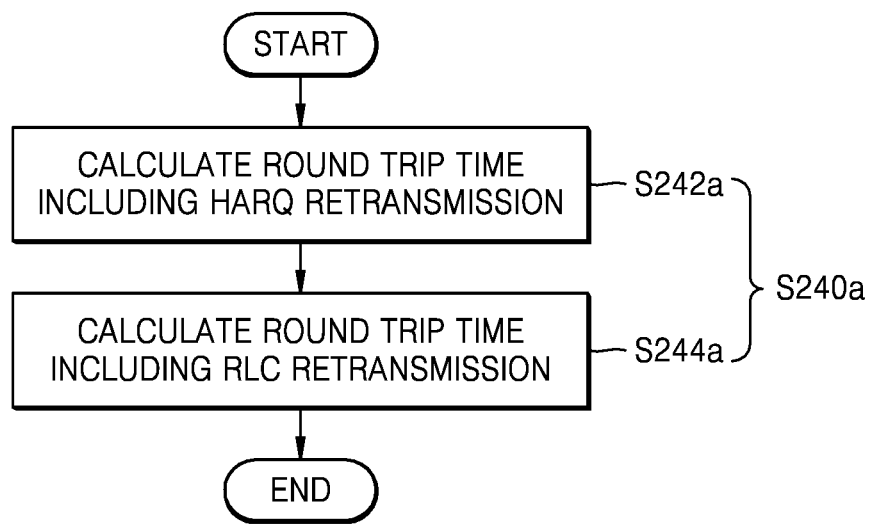
FIGS. 7A and 7B are flowcharts illustrating operation S240 of FIG. 6, according to exemplary embodiments.
Figure 7B:
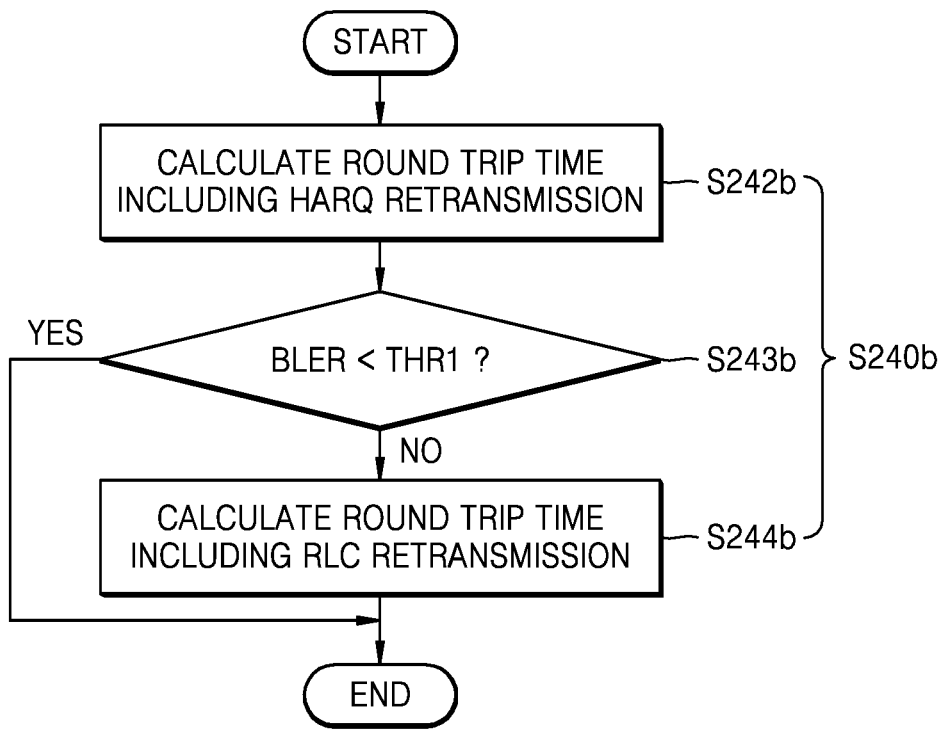

FIGS. 7A and 7B are flowcharts illustrating operation S240 of FIG. 6, according to exemplary embodiments.

An operation of calculating the first round trip time $RTT_1$ as described above with reference to FIG. 6 may be performed in operation S240a of FIG. 7A and S240b of FIG. 7B. Repetitive descriptions will be omitted in describing the embodiments of FIGS. 7A and 7B. FIGS. 7A and 7B will be described with reference to FIGS. 1 and 3, and an example which estimates the first round trip time $RTT_1$ corresponding to the first channel CH1 based on the assumption that the UE 30 of FIG. 1 is the UE 30" of FIG. 3 will be described.

Referring to FIG. 7A, operation S240a may include operation S242a and operation S244a, and an operation of calculating a round trip time including HARQ retransmission may be performed in operation S242a. For example, the PDCP 34' may calculate a first round trip time $RTT_{S1}$ including HARQ retransmission by using a block error rate BLER as in the following Equation (5):

$$RTT_{S1}=(1-BLER_1)\times\Sigma_{n=0}^{N1-1}BLER_1^n(p_1+n\times c_1) \quad (5)$$

In Equation (5), a first block error rate $BLER_1$ may denote a block error rate measured in the first channel CH1. In some embodiments, the PDCP 34' may obtain the first block error rate $BLER_1$ from an indicator provided by the first PHY layer 31a' among the first indicators IND1.

First propagation delay $p_1$ may represent propagation delay occurring in the first channel CH1. In some embodiments, the PDCP 34' may obtain the first propagation delay $p_1$ from the first MAC 32a'. For example, the first base station 10 may allocate a dedicated random access preamble to the UE 30", and when the UE 30" does not include a wireless resource for first accessing the first base station 10 or for transmitting a signal to the first base station 10, the UE 30" may perform a random access procedure (RACH), based on the random access preamble. The first base station 10 may measure a transmission time of the UE 30" by using a random access preamble (or a sounding reference signal (SRS)), calculate a correction timing value, and inform the UE 30" of the calculated correction timing value. The correction timing value (i.e., a timing advance value) provided from the first base station 10 to the UE 30" may be referred to as a timing advance command (TAC), and the TAC may be processed in an MAC layer. Therefore, the first MAC 32a' of the UE 30" may generate the first propagation delay $p_1$, based on the TAC and may provide the PDCP 34' with the first propagation delay $p_1$ as one of the first indicators IND1.

In some embodiments, the first propagation delay $p_1$ may be omitted in calculating the first round trip time $RTT_{S1}$ including HARQ retransmission. For example, in Equation (5), the first propagation delay $p_1$ may have a small value compared to '$n1\times c1$', and thus, the first round trip time $RTT_{S1}$ including HARQ retransmission may be calculated as in the following Equation (6). In this case, an operation of obtaining the first propagation delay $p_1$ as a first retransmission parameter from the first MAC 32a' may be omitted in operation S220 of FIG. 6:

$$RTT_{S1}=(1-BLER_1)\times\Sigma_{n=0}^{N1-1}BLER_1^n(n\times c_1) \quad (6)$$

In some embodiments, the PDCP 34' may determine the first round trip time $RTT_{S1}$ as the first propagation delay $p_1$ in an RLC unacknowledge mode (UM). For example, when the first block error rate $BLER_1$ is approximately maintained as zero, the RLC UM may be set, and the PDCP 34' may determine the first round trip time $RTT_{S1}$ as the first propagation delay $p_1$. Also, in some other embodiments, the PDCP 34' may reflect the variation $\Delta w$ at every first propagation delay $p_1$ (i.e., first round trip time $RTT_{S1}$).

It should be understood that the second round trip time $RTT_{S2}$ which includes HARQ retransmission and corresponds to the second channel CH2 is similarly calculated based on Equation (5) and/or Equation (6).

In operation S244a, an operation of calculating a round trip time including RLC retransmission may be performed. For example, the PDCP 34' may calculate a first round trip time $RTT_{T1}$ including RLC retransmission as in the following Equation (7):

$$RTT_{T1}=RTT_{S1}\times\Sigma_{r=0}^{R1}(BLER_1^{N1})^r \quad (7)$$

In the embodiment of FIG. 7A, the PDCP 34' may use the first round trip time $RTT_{T1}$, calculated based on Equation (7), as the data variation $\Delta w$ of Equation (3). Also, it should be understood that the second round trip time $RTT_{S2}$ which includes HARQ retransmission and corresponds to the second channel CH2 is similarly calculated based on Equation (7).

Referring to FIG. 7B, operation S240b may include operation S242b, operation S243b, and operation S244b. In comparison with operation S240a of FIG. 7A, operation S240b of FIG. 7B may further include operation S243b. Similarly to operation S242a of FIG. 7A, an operation of calculating a round trip time including HARQ retransmission may be performed in operation S242b. Therefore, a first round trip time $RTT_{S1}$ and a second round trip time $RTT_{S2}$ each including HARQ retransmission may be calculated.

In operation S243b, an operation of comparing a block error rate BLER with a predefined first threshold value THR1 may be performed. For example, in a process of calculating the first round trip time $RTT_{S1}$, a first block error rate $BLER_1$ may be compared with the predefined first threshold value THR1, and as illustrated in FIG. 7B, when the first block error rate $BLER_1$ is less than the first threshold value THR1, operation S240b may end. On the other hand, when the first block error rate $BLER_1$ is equal to or greater than the first threshold value THR1, operation S244b may be performed, and an operation of calculating a first round trip time $RTT_{T1}$ including RLC retransmission may be performed in operation S244b.

As a result, in the embodiment of FIG. 7B, when the first block error rate $BLER_1$ is less than the first threshold value THR1, the first round trip time $RTT_{S1}$, including HARQ retransmission, of Equation (5) or (6) may be determined as a final first round trip time $RTT_1$. On the other hand, when the first block error rate $BLER_1$ is equal to or greater than the first threshold value THR1, the first round trip time $RTT_{T1}$ including RLC retransmission may be determined as the final first round trip time $RTT_1$. In a state where a block error rate is low, a possibility that RLC retransmission occurs may be low, and thus, in the embodiment of FIG. 7B, operation S244b (for example, calculation based on Equation (7)) may be omitted.

Figure 8:
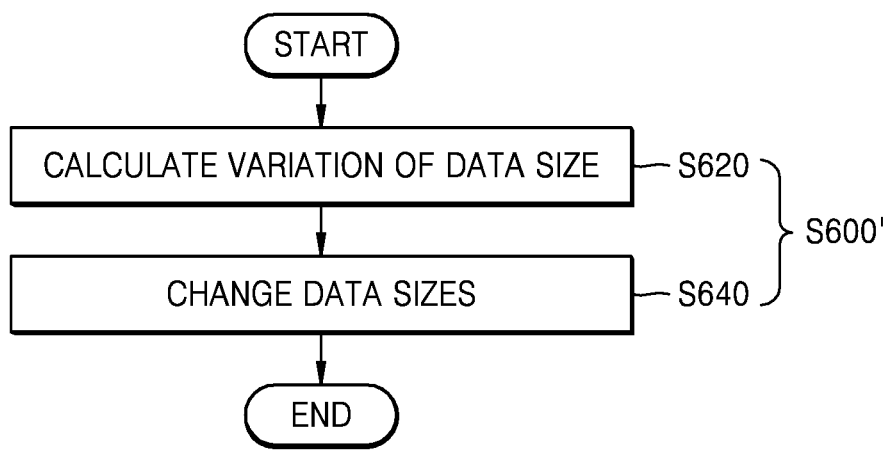
FIG. 8 is a flowchart illustrating operation S600 of FIG. 4, according to an exemplary embodiment.

FIG. 8 is a flowchart illustrating operation S600 of FIG. 4, according to an exemplary embodiment. As described above with reference to FIG. 4, an operation of determining sizes of pieces of split data (for example, first data and second data) may be performed in operation S600' of FIG. 8. As illustrated in FIG. 8, operation S600' may include operation S620 and operation S640. Hereinafter, FIG. 8 will be described with reference to FIGS. 3 and 4.

In operation S620, an operation of calculating a variation of data size may be performed. For example, the PDCP 34' may calculate a variation $\Delta w$ of data size as in Equation (3), based on the round trip times obtained through operation S200 and the channel bandwidths obtained through operation S400. In some embodiments, the variation Δw may be identically applied to a plurality of channels.

In some embodiments, when a variation of data size is not calculated each time ACK occurs, a variation $\Delta w_1$ of data size corresponding to the first channel CH1 may be calculated as in the following Equation (8):

$$\Delta w_1 = \frac{\max\left(\frac{BW_1}{RTT_1}, \frac{BW_2}{RTT_2}\right)}{(BW_1 + BW_2)^2} \times N_{ACK1} \quad (8)$$

In Equation (8), $N_{ACK1}$ may denote the number of ACKs received through the first channel CH1 from the first base station 10. For example, the PDCP 34' may calculate the variation $\Delta w_1$ of data size in the RLC AM, based on Equation (8). Similarly, a variation $\Delta w_2$ of data size corresponding to the second channel CH2 may be calculated by using $N_{ACK2}$ which denotes the number of ACKs received through the second channel CH2 from the second base station 20.

In multi-connectivity based on M number of channels, a variation $\Delta w_i$ of data size corresponding to an $i^{th}$ channel CHi may be calculated as in the following Equation (9):

$$\Delta w_i = \frac{\max_{1 \leq i \leq M} \frac{BW_i}{RTT_i}}{\left(\sum_{i=1}^{M} BW_i\right)^2} \times N_{ACKi} \quad (9)$$

In operation S640, an operation of changing data sizes may be performed. For example, the PDCP 34' may add the variation Δw, calculated through operation S620, to data sizes set in a plurality of channels to change the data sizes. In some embodiments, when the variation Δw is identically applied to the plurality of channels, the same variation Δw may be added to the data sizes set in the plurality of channels. For example, retransmission may rarely occur in a channel having a sufficient quality, and thus, even when the variation Δw has a negative value, a large amount of data may be transmitted through the channel having a sufficient quality (or channel state) compared to a channel having a lower quality. Also, retransmission may frequently occur in the channel having a poor quality, and thus, even when the variation Δw has a positive value, a small amount of data may be transmitted through the channel having a lower quality, compared to the channel having a sufficient quality.

Figure 9A:
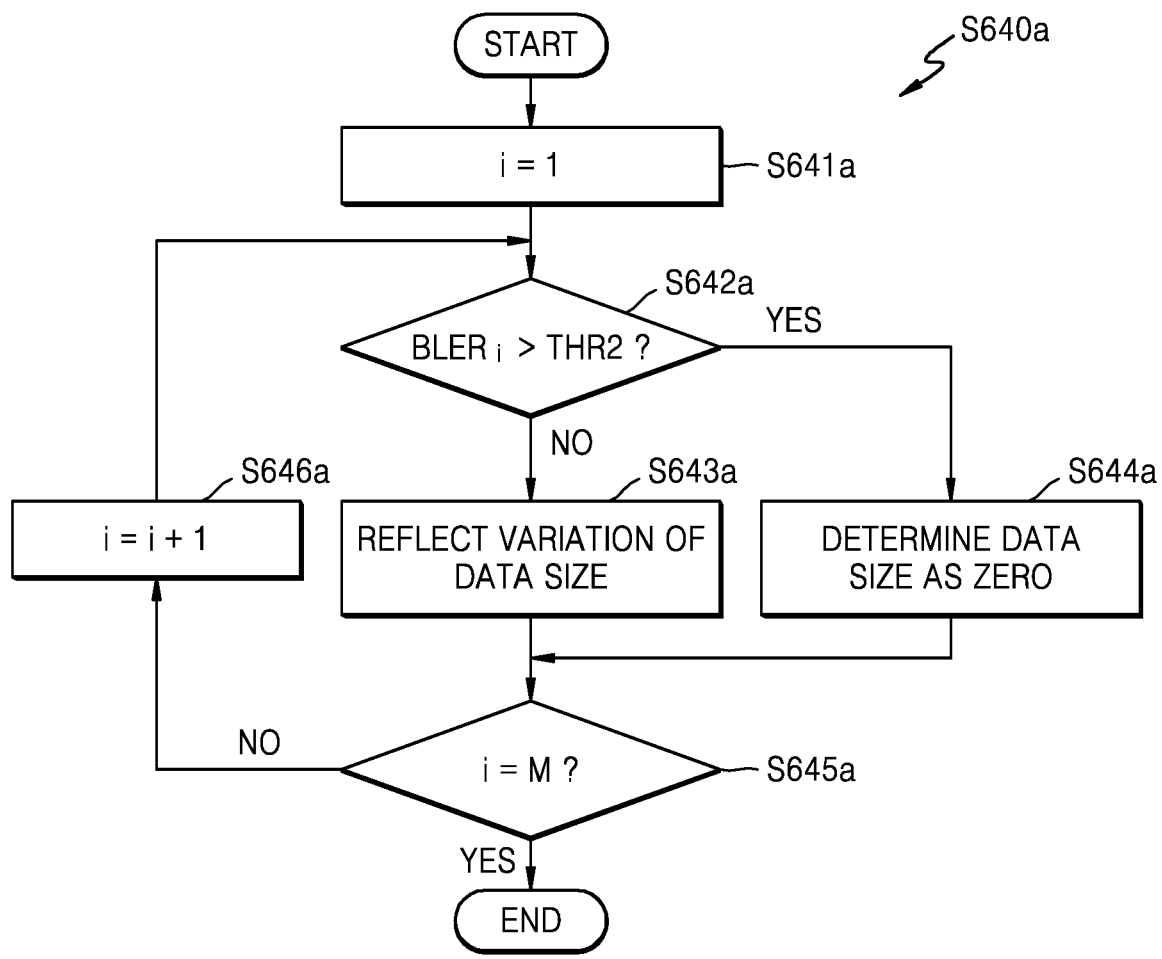
FIGS. 9A and 9B are flowcharts illustrating operation S640 of FIG. 8, according to exemplary embodiments.
Figure 9B:
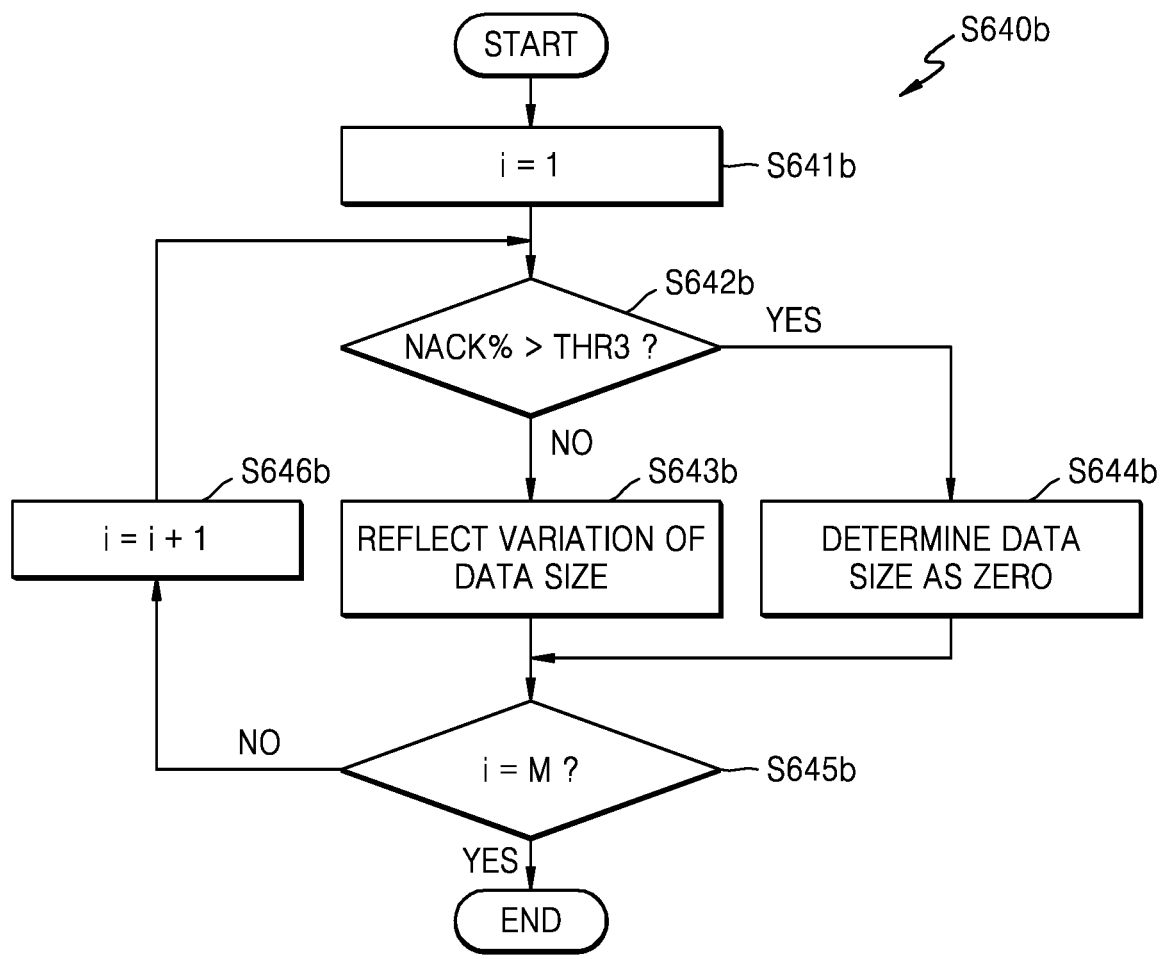

FIGS. 9A and 9B are flowcharts illustrating operation S640 of FIG. 8, according to exemplary embodiments. In detail, operation S640a of FIG. 9A and operation S640b of FIG. 9B may respectively include operations S644a and S644b of blocking transmission of data through a channel which has a poor channel state. As described below with reference to FIG. 8, an operation of changing data sizes may be performed in operation S640a of FIG. 9A and operation S640b of FIG. 9B. Hereinafter, repetitive descriptions will be omitted in describing FIGS. 9A and 9B, and FIGS. 9A and 9B will be described with reference to FIG. 3.

Referring to FIG. 9A, operation S640a may include operations S641a to S646a, and an initialization operation may be performed in operation S641a. For example, as illustrated in FIG. 9A, a variable i representing an index of a channel may be set to 1. In the embodiment of FIG. 9A, sizes of pieces of data which are to be transmitted through M number of channels may be determined, and thus, the variable i may have a value "1 to M".

In operation S642a, an operation of comparing a block error rate $BLER_i$ of an $i^{th}$ channel with a predefined second threshold value THR2 may be performed. As illustrated in FIG. 9A, when the block error rate $BLER_i$ of the $i^{th}$ channel is greater than the second threshold value THR2, operation S644a may be performed, and an operation of determining a data size as zero may be performed in operation S644a. On the other hand, when the block error rate $BLER_i$ of the $i^{th}$ channel is equal to or less than the second threshold value THR2, operation S643a may be performed, and an operation of reflecting a variation of data size in data distribution may be performed in operation S643a. As a result, when a block error rate BLER of a channel is high, the PDCP 34' may block transmission of data through a corresponding channel.

In operation S645a, an operation of comparing the variable i with M may be performed. As illustrated in FIG. 9A, when the variable i does not match M, namely, when the variable i is less than M, the variable i may increase by one in operation S646a, and operation S642a may be performed again. On the other hand, when the variable i matches M, namely, when data sizes corresponding to the M channels are all determined, operation S640a may end.

Referring to FIG. 9B, operation S640b may include operations S641b to S646b. Operations similar to the operations performed in some operations among operations S641a and S643a to S646a of operation S640a of FIG. 9A may be performed in some operations among operations S641b and S643b to S646b of FIG. 9B.

In operation S642b, an operation of comparing a predefined threshold value THR3 with a rate NACK % of a negative unacknowledge response (NACK) occurring in the $i^{th}$ channel may be performed. As illustrated in FIG. 9B, when the rate NACK % of NACK occurring in the $i^{th}$ channel is higher than the threshold value THR3, operation S644b may be performed, and when the rate NACK % of NACK occurring in the $i^{th}$ channel is equal to or lower than the threshold value THR3, operation S643b may be performed. As a result, when an NACK rate NACK % of a channel is high, the PDCP 34' may block transmission of data through a corresponding channel.

Figure 10:
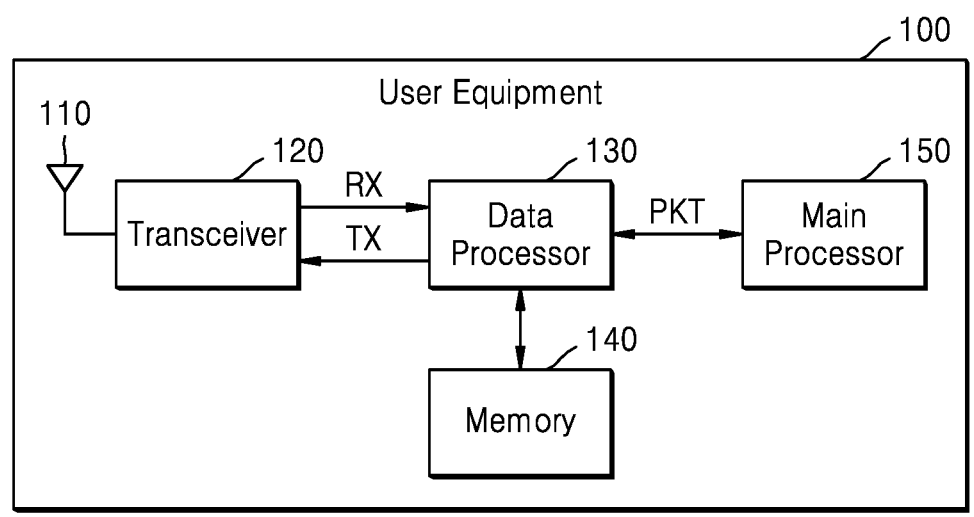
FIG. 10 is a block diagram illustrating user equipment according to an exemplary embodiment.

FIG. 10 is a block diagram illustrating UE 100 according to an exemplary embodiment. As described above with reference to FIG. 1, the UE 100 of FIG. 10 may support multi-connectivity and may perform wireless communication with two or more base stations. As illustrated in FIG. 10, the UE 100 may include an antenna 110, a transceiver 120, a data processor 130, a memory 140, and a main processor 150. The elements of the UE 100 are independently illustrated in FIG. 10, but in some embodiments, two or more elements may be implemented as one entity (for example, a semiconductor chip).

The antenna 110 may receive a radio frequency (RF) signal from a base station, or may transmit an RF signal to the base station. In some embodiments, the antenna 110 may be configured as an antenna array including a plurality of antennas and may support multiple input multiple output (MIMO) and beam forming.

The transceiver 120 may process a signal between the antenna 110 and the data processor 130. For example, the transceiver 120 may include a duplexer, a switch, a filter, a multiplexer, and an amplifier. Also, the transceiver 120 may process an RF signal received through the antenna 110 to generate a reception signal RX and may provide the reception signal RX to the data processor 130. Also, the transceiver 120 may process a transmission signal TX provided from the data processor 130 to generate an RF signal and may provide the generated RF signal to the antenna 110. In some embodiments, the transceiver 120 may be referred to as a radio frequency integrated circuit (RFIC).

The data processor 130 may process a data packet PKT received from the main processor 150 to generate the transmission signal TX, process the reception signal RX received from the transceiver 120 to generate the data packet PKT, and provide the generated data packet PKT to the main processor 150. The data processor 130 may perform an operation corresponding to at least one layer in a wireless protocol structure. For example, the data processor 130 may be referred to as a communication protocol and may perform functions of the first and second PHY layers 31a' and 31b', the first and second MACs 32a' and 32b', the first and second RLCs 33a' and 33b', and the PDCP 34' of FIG. 3. In some embodiments, the data processor 130 may include hardware including a logic block designed based on a logic combination, include a processing unit which includes software and at least one core (or at least one processor) for executing the software, and include a combination of the hardware and the processing unit. For example, the data processor 130 may include hardware blocks and/or software blocks respectively corresponding to the first and second PHY layers 31a' and 31b', the first and second MACs 32a' and 32b', the first and second RLCs 33a' and 33b', and the PDCP 34' of FIG. 3. The method according to exemplary embodiments described above with reference to the drawings and at least one operation included in the method may be performed by the data processor 130. In some embodiments, a base station (for example, 10 and/or 20 of FIG. 1) may have a structure similar to that of the UE 100 of FIG. 10, and a data processor included in the base station may perform a method for dual connectivity and at least one operation included in the method.

The memory 140 may store data needed for a process of processing, by the data processor 130, a signal and/or data. In some embodiments, the memory 140 may store software (i.e., a series of instructions) executed by the data processor 130.

The main processor 150 may include at least one core (or a processor). Also, the main processor 150 may transfer the data packet PKT, which is to be transmitted through wireless communication, to the data processor 130 and may receive data transmitted from the base station, based on the data packet PKT provided from the data processor 130. The main processor 150 may control an operation of the UE 100 and may generate the data packet PKT or may perform an operation, based on a received data packet PKT.

Figure 11A:
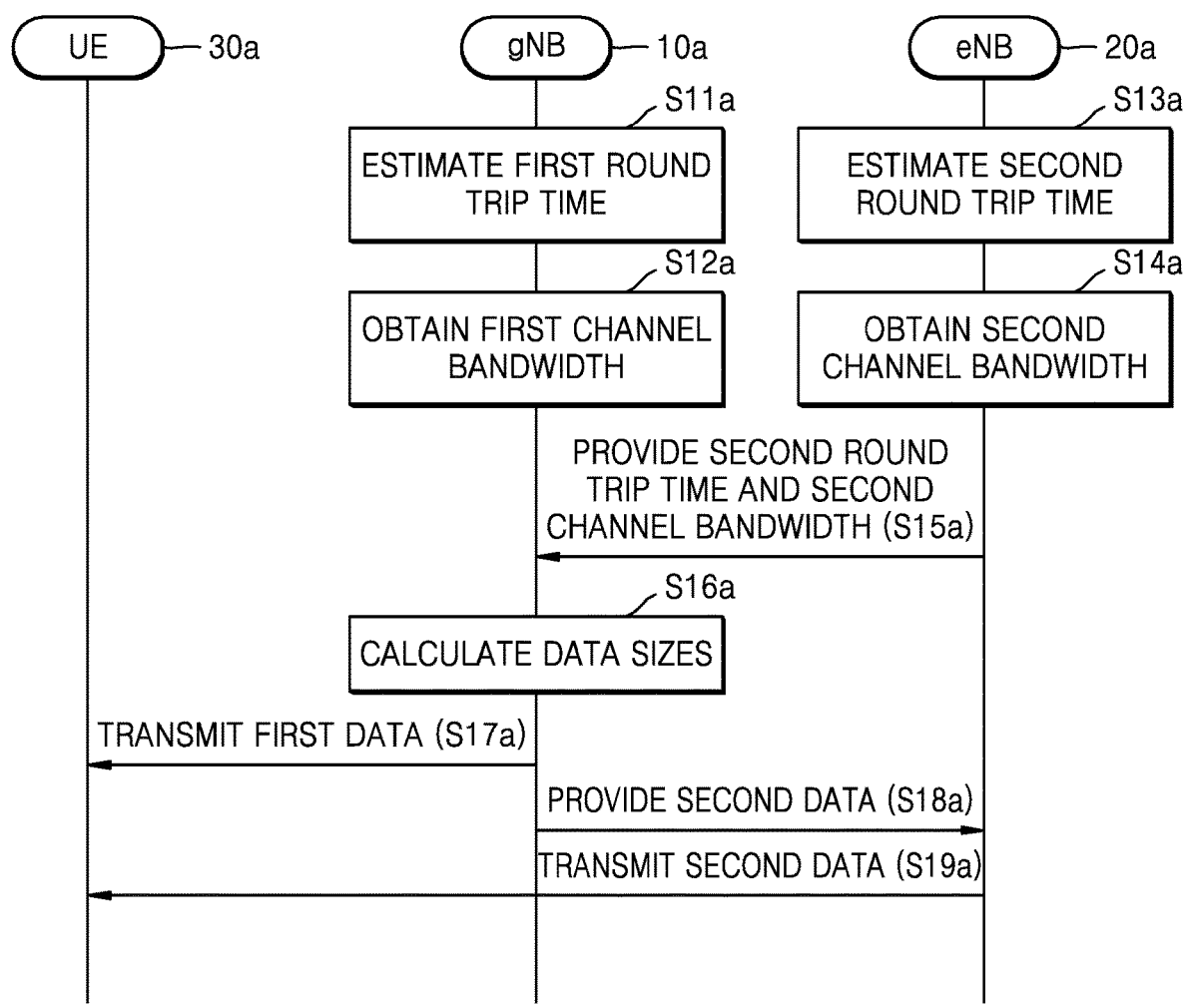
FIGS. 11A and 11B are diagrams illustrating a method for multi-connectivity with respect to time flow, according to exemplary embodiments.
Figure 11B:
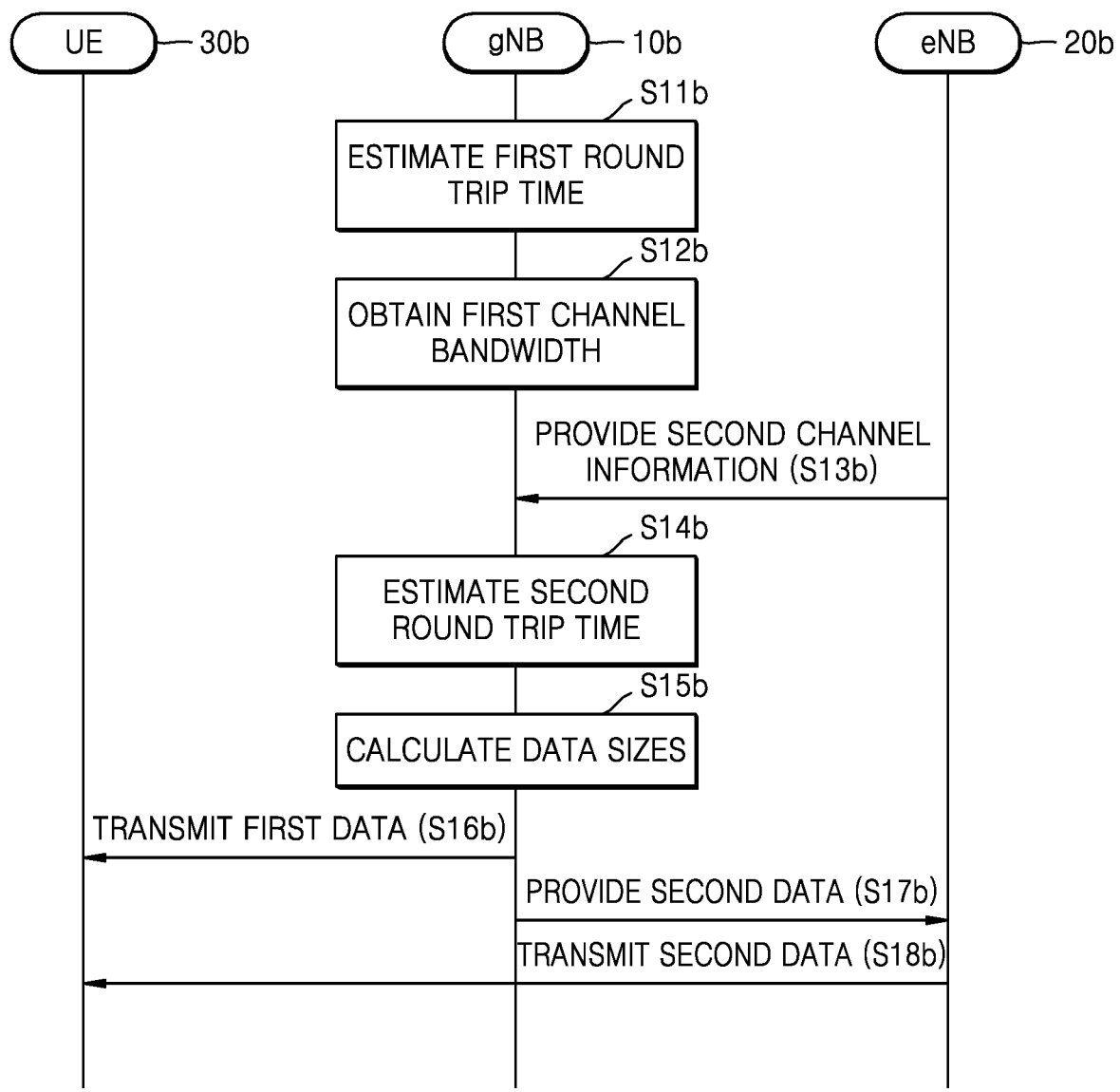

FIGS. 11A and 11B are diagrams illustrating a method for multi-connectivity with respect to time flow, according to exemplary embodiments. In detail, FIGS. 11A and 11B are diagrams illustrating examples of a method for multi-connectivity in the downlink. In some embodiments, one of the base stations connected to UE may perform splitting of data for multi-connectivity, and examples where first base stations 10a and 10b, which are base stations (for example, gNBs) of a 5G NR system, perform splitting of data for multi-connectivity will be described below with reference to FIGS. 11A and 11B. However, it should be understood that exemplary embodiments are not limited thereto. Hereinafter, FIGS. 11A and 11B will be described with reference to FIG. 1, and it may be assumed that the first base station 10, the second base station 20, and the UE 30 of FIG. 1 correspond to the first base station 10a, the second base station 20a, and the UE 30a of FIG. 11A and correspond to the first base station 10b, the second base station 20b, and the UE 30b of FIG. 11B. Repetitive descriptions will be omitted in describing FIGS. 11A and 11B.

Referring to FIG. 11A, a second round trip time $RTT_2$ corresponding to the second channel CH2 may be estimated by the second base station 20a which establishes the second channel CH2 with the UE 30a, and the estimated second round trip time $RTT_2$ may be provided from the second base station 20a to the first base station 10a.

In operation S11a, the first base station 10a may estimate a first round trip time $RTT_1$. The first base station 10a may establish the first channel CH1 with the UE 30a, and thus, as described above with reference to the drawings, the first base station 10a may estimate the first round trip time $RTT_1$ in a manner similar to a manner of estimating, by the UE 30a, the first round trip time $RTT_1$. Also, in operation S12a, the first base station 10a may obtain a first channel bandwidth $BW_1$.

In operation S13a, the second base station 20a may estimate the second round trip time $RTT_2$. The second base station 20a may establish the second channel CH2 with the UE 30a, and thus, as described above with reference to the drawings, the second base station 20a may estimate the second round trip time $RTT_2$ in a manner similar to a manner of estimating, by the UE 30a, the second round trip time $RTT_2$. Also, in operation S14a, the second base station 20a may obtain a second channel bandwidth $BW_2$.

In operation S15a, the second base station 20a may provide the second round trip time $RTT_2$ and the second channel bandwidth $BW_2$ to the first base station 10a. For example, as described above with reference to FIG. 1, the second base station 20a may provide the second round trip time $RTT_2$ and the second channel bandwidth $BW_2$ to the first base station 10a through the interface IF.

In operation S16a, the first base station 10a may calculate data sizes. For example, the first base station 10a may collect information about the first and second channels CH1 and CH2 in operations S11a to S15a and may calculate a variation Δw of data size as in Equation (3), based on the collected information. The first base station 10a may reflect the variation Δw of data size in calculating a size of first data which is to be transmitted from the first base station 10a to the UE 30a and a size of second data which is to be transmitted from the second base station 20a to the UE 30a.

In operation S17a, the first base station 10a may transmit the first data to the UE 30a through the first channel CH1, based on the calculated size of the first data. Also, in operation S18a, the first base station 10a may provide the second data to the second base station 20a. In operation S19a, the second base station 20a may transmit the second data, provided from the first base station 10a, to the UE 30a through the second channel CH2.

Referring to FIG. 11B, a second base station 20b which establishes the second channel CH2 with UE 30b may provide a first base station 10b with information about the second channel CH2, and the first base station 10b may estimate a second round trip time $RTT_2$, based on the information about the second channel CH2.

In operation S11b, the first base station 10b may estimate a first round trip time $RTT_1$, and in operation S12b, the first base station 10b may obtain a first channel bandwidth $BW_1$.

In operation S13b, the second base station 20b may provide second channel information to the first base station 10b. For example, as described above with reference to the drawings, the second base station 20b may provide the first base station 10b with information (for example, second retransmission parameters corresponding to the second channel CH2) used to estimate the second round trip time RTT$_2$ and information (for example, second channel information including a second channel bandwidth BW$_2$) used to calculate a variation Δw of data size. In some embodiments, the second base station 20b may provide the first base station 10b with propagation delay (i.e., second propagation delay p$_2$) corresponding to the second channel CH2.

In operation S14b, the first base station 10b may estimate the second round trip time RTT$_2$. For example, the first base station 10b may estimate the second round trip time RTT$_2$ by using Equation (5), Equation (6), and/or Equation (7), based on the second channel information which is provided in operation S13b.

In operation S15b, the first base station 10b may calculate data sizes. In operation S16b, the first base station 10b may transmit first data to the UE 30b through the first channel CH1, based on a calculated size of the first data. Also, in operation S17b, the first base station 10b may provide second data to the second base station 20b. In operation S18b, the second base station 20b may transmit the second data, provided from the first base station 10b, to the UE 30b through the second channel CH2.

Figure 12:
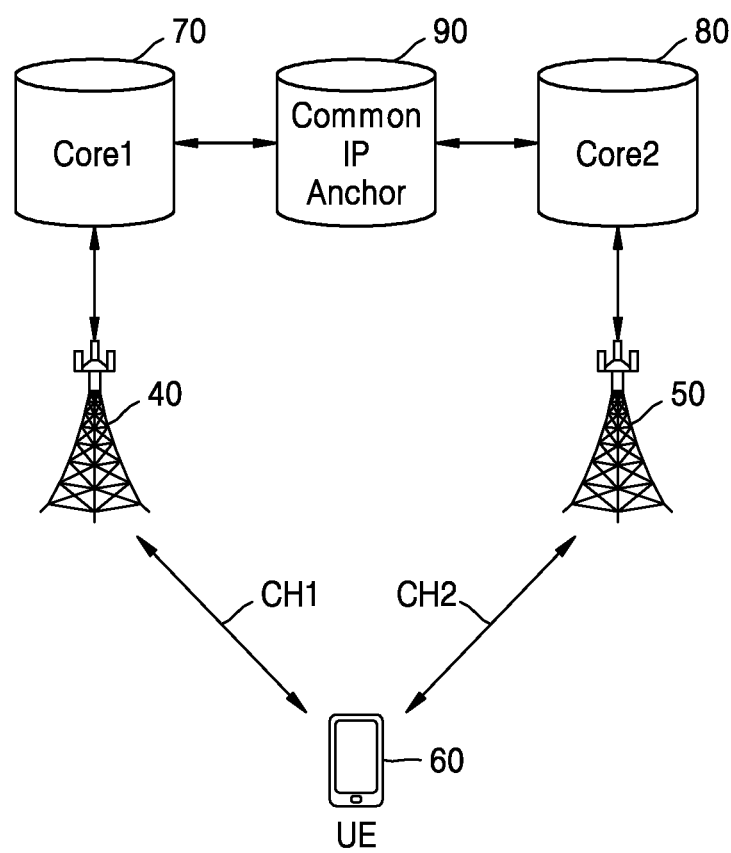
FIG. 12 is a diagram illustrating multi-connectivity according to an exemplary embodiment.

FIG. 12 is a diagram illustrating multi-connectivity according to an exemplary embodiment. In detail, FIG. 12 illustrates a structure including cores (for example, a first core and a second core) 70 and 80 connected to base stations (for example, a first base station and a second base station) 40 and 50. Hereinafter, in describing FIG. 12, description overlapping FIG. 1 will be described.

Referring to FIG. 12, UE 60 may access the first base station 40 through a first channel CH1 and may access the second base station 50 through a second channel CH2. The first base station 40 may access the first core 70, and the second base station 50 may access the second core 80. For example, the first base station 40 may be a base station of the 5G NR system, and the second base station 50 may be a base station of the LTE system. In this case, the second core 80 may be referred to as an evolved packet core (EPC).

The first core 70 and the second core 80 may access a common Internet protocol (IP) anchor 90, and the common IP anchor 90 may be a network entity and may perform a function of routing data transferred from a data network to one UE 60. In some embodiments, the common IP anchor 90 may perform splitting of data in multi-connectivity, and relevant embodiments will be described below with reference to FIGS. 13A and 13B.

Figure 13A:
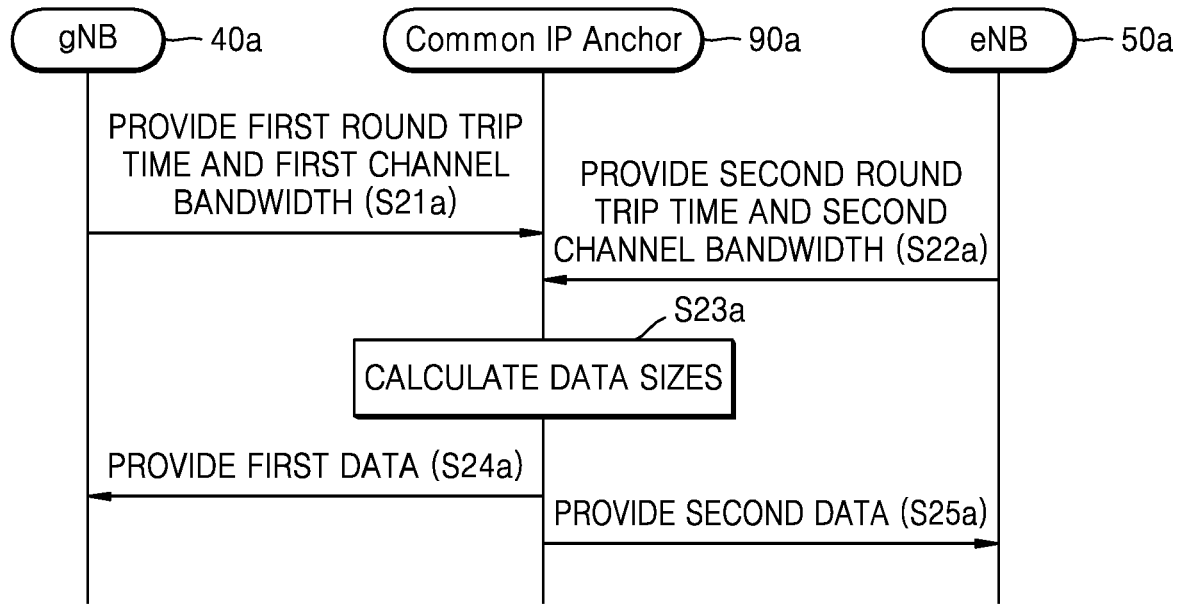
FIGS. 13A and 13B are diagrams illustrating a method for multi-connectivity with respect to time flow, according to exemplary embodiments.
Figure 13B:
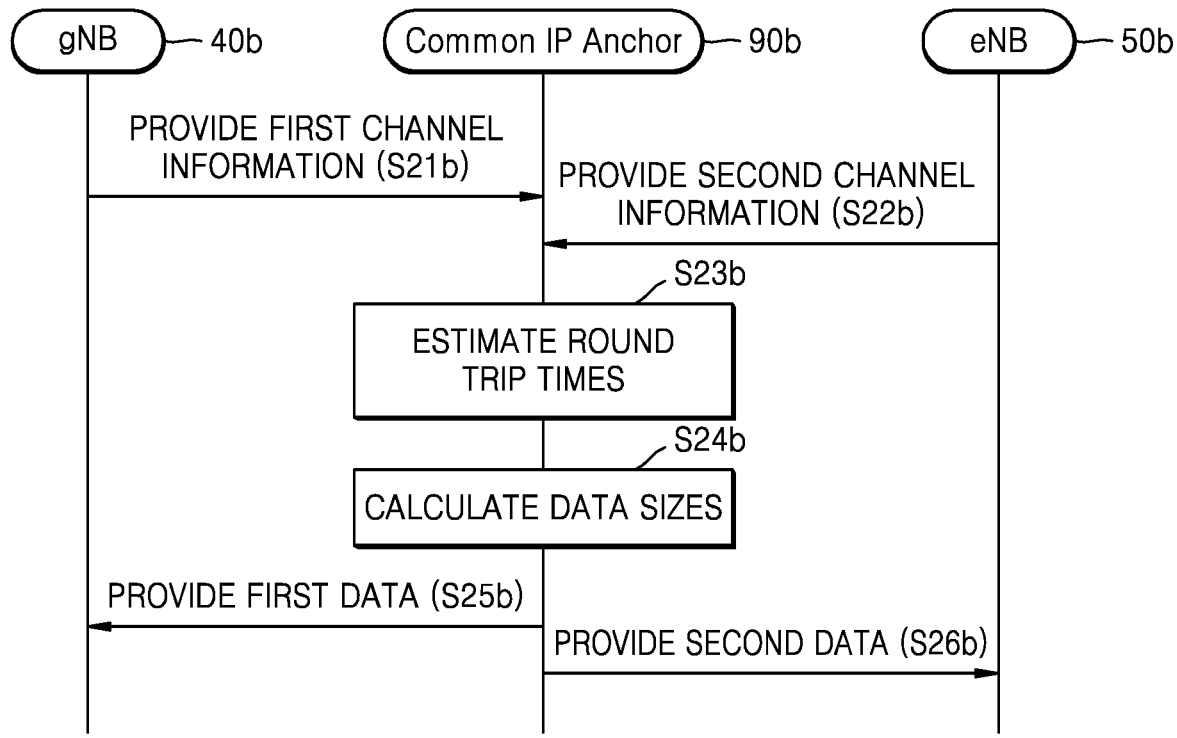

FIGS. 13A and 13B are diagrams illustrating a method for multi-connectivity with respect to time flow, according to exemplary embodiments. In detail, FIGS. 13A and 13B illustrate examples of a method for multi-connectivity in the downlink. In some embodiments, common IP anchors 90a and 90b may perform splitting of data for multi-connectivity, and examples where data is distributed to first base stations 40a and 40b of the 5G NR system and second base stations 50a and 50b of the LTE system will be described below with reference to FIGS. 13A and 13B. However, it should be understood that exemplary embodiments are not limited thereto.

Referring to FIG. 13A, the common IP anchor 90a may split data, based on round trip times and channel bandwidths provided from the first base station 40a and the second base station 50a. In operation S21a, the first base station 40a may provide the common IP anchor 90a with a first round trip time RTT$_1$ and a first channel bandwidth BW$_1$ each corresponding to a first channel CH1. In operation S22a, the second base station 50a may provide the common IP anchor 90a with a second round trip time RTT$_2$ and a second channel bandwidth BW$_2$ each corresponding to a second channel CH2. For example, the first base station 40a and the second base station 50a may respectively calculate the first round trip time RTT$_1$ and the second round trip time RTT$_2$, based on Equation (5), Equation (6), and/or Equation (7).

In operation S23a, the common IP anchor 90a may calculate sizes of pieces of split data, based on the round trip times and the channel bandwidths provided from the first base station 40a and the second base station 50a. For example, the common IP anchor 90a may calculate a variation Δw of data size, based on Equation (3) and may reflect the variation Δw of data size in calculating a size of first data which is to be transmitted through the first channel CH1 and a size of second data which is to be transmitted through the second channel CH2. Subsequently, in operation S24a, the common IP anchor 90a may provide the first data to the first base station 40a, and in operation S25a, the common IP anchor 90a may provide the second data to the second base station 50a.

Referring to FIG. 13B, the common IP anchor 90b may split data, based on channel information provided from each of the first base station 40b and the second base station 50b. In operation S21b, the first base station 40b may provide the common IP anchor 90b with first channel information corresponding to a first channel CH1. In operation S22b, the second base station 50b may provide the common IP anchor 90b with second channel information corresponding to a second channel CH2. For example, the first channel information may include first retransmission parameters and a first channel bandwidth, and the second channel information may include second retransmission parameters and a second channel bandwidth.

In operation S23b, the common IP anchor 90b may estimate round trip times. For example, the common IP anchor 90b may estimate the first round trip time RTT$_1$ and the second round trip time RTT$_2$ by using Equation (5), Equation (6), and/or Equation (7), based on the first channel information and the second channel information. In operation S24b, the common IP anchor 90b may calculate sizes of pieces of split data. For example, the common IP anchor 90b may calculate a variation Δw of data size, based on Equation (3) and may reflect the variation Δw of data size in calculating a size of first data which is to be transmitted through the first channel CH1 and a size of second data which is to be transmitted through the second channel CH2. In operation S25b, the common IP anchor 90b may provide the first data to the first base station 40b, and in operation S26b, the common IP anchor 90b may provide the second data to the second base station 50b.

While the inventive concept has been particularly shown and described with reference to embodiments thereof, it will be understood that various changes in form and details may be made therein without departing from the spirit and scope of the following claims.

What is claimed is:

1. A method performed by a user equipment communicating with a plurality of base stations through a plurality of channels, the method comprising:
   estimating a first round trip time (RTT) based on a first block error rate (BLER) of a first channel among the plurality of channels;
   estimating a second RTT based on a second BLER of a second channel among the plurality of channels;
   adjustably determining a size of first uplink data based on an estimated value of the first RTT and an estimated value of the second RTT and adjustably determining and a size of second uplink data based on the estimated value of the first RTT and the estimated value of the second RTT; and transmitting the first uplink data and the second uplink data through the first channel and the second channel, respectively, wherein the first uplink data and the second uplink data are included in uplink data to be transmitted through the plurality of channels.

2. The method of claim 1, wherein
the estimating the first RTT is further based on at least one first retransmission parameter of the first channel, and
the estimating the second RTT is further based on at least one second retransmission parameter of the second channel.

3. The method of claim 2, wherein
the at least one first retransmission parameter comprises a first retransmission period and a first maximum retransmission number, and
the at least one second retransmission parameter comprises a second retransmission period and a second maximum retransmission number.

4. The method of claim 3, wherein
the estimating the first RTT comprises calculating an $RTT_{S1}$, which is expressed in an equation below:

$$RTT_{S1}=(1-BLER_1)*\Sigma_{n=0}^{N_1-1}BLER_1^n(n*c_1),$$

wherein the $BLER_1$, $N_1$ and $c_1$ are the first BLER, the first maximum retransmission number and the first retransmission period, respectively.

5. The method of claim 4, wherein the at least one first retransmission parameter further comprises a maximum retransmission number of a radio link control (RLC) entity.

6. The method of claim 5, wherein the estimating the first RTT further comprises calculating $RTT_{T1}$, which is expressed in an equation below:

$$RTT_{T1}=RTT_{S1}*\Sigma_{r=0}^{R_1}(BLER_1^{N_1})^r,$$

wherein $R_1$ is the maximum retransmission number of the RLC entity, and the $RTT_{T1}$ is determined as the first RTT.

7. The method of claim 4, wherein the estimating the first RTT further comprises determining the $RTT_{S1}$ as the first RTT based on the first BLER being less than a first threshold value.

8. The method of claim 3, wherein
the estimating the first RTT is further based on a first propagation delay of the first channel, and
the estimating the second RTT is further based on a second propagation delay of the second channel.

9. The method of claim 3, wherein the estimating the first RTT comprises calculating an $RTT_{S1}$, which is expressed in an equation below:

$$RTT_{S1}=(1-BLER_1)*\Sigma_{n=0}^{N_1-1}BLER_1^n(p_1+n*c_1),$$

wherein the $BLER_1$, $N_1$, $p_1$ and $c_1$ are the first BLER, the first maximum retransmission number, a first propagation delay of the first channel and the first retransmission period, respectively.

10. The method of claim 9, wherein
the at least one first retransmission parameter further comprises a maximum retransmission number of a radio link control (RLC) entity, and
the estimating the first RTT further comprises calculating $RTT_{T1}$, which is expressed in an equation below:

$$RTT_{T1}=RTT_{S1}*\Sigma_{r=0}^{R_1}(BLER_1^{N_1})^r,$$

wherein $R_1$ is the first RTT and the maximum retransmission number of the RLC entity, and the $RTT_{T1}$ is determined as the first RTT.

11. The method of claim 1, wherein the adjustably determining the size of the first uplink data and the size of the second uplink data comprises determining the size of the first uplink data as zero based on the first BLER being greater than a second threshold.

12. The method of claim 1, wherein the adjustably determining the size of the first uplink data and the size of the second uplink data comprises determining the size of the first uplink data as zero based on a rate of negative unacknowledge response (NACK) through the first channel being greater than a third threshold value.

13. The method of claim 1, wherein the adjustably determining the size of the first uplink data and the size of the second uplink data comprises calculating a variation $\Delta w$ of the size of the first uplink data and the size of the second uplink data, which is expressed in an equation below:

$$\Delta w = \frac{\max\left(\frac{BW_1}{RTT_1}, \frac{BW_2}{RTT_2}\right)}{(BW_1+BW_2)^2},$$

and
wherein the $RTT_1$, the $RTT_2$, the $BW_1$, and the $BW_2$ are the first RTT, the second RTT, a bandwidth of the first channel, and a bandwidth of the second channel, respectively.

14. A method performed by a first base station communicating with a user equipment through a first channel, the method comprising:
estimating a first round trip time (RTT) based on a first block error rate (BLER) of the first channel;
obtaining a second RTT of a second channel, wherein the user equipment communicates with a second base station through the second channel;
adjustably determining a size of first downlink data based on an estimated value of the first RTT and an estimated value of the second RTT and adjustably determining and a size of second downlink data based on the estimated value of the first RTT and the estimated value of the second RTT;
transmitting the first downlink data through the first channel; and
providing the second downlink data to the second base station,
wherein the first downlink data and the second downlink data are included in downlink data to be transmitted to the user equipment.

15. The method of claim 14, wherein the obtaining the second RTT comprises receiving the second RTT from the second base station.

16. The method of claim 14, wherein the obtaining the second RTT comprises:
receiving information about the second channel from the second base station; and
estimating the second RTT, based on the information.

17. The method of claim 14, wherein
the estimating the first RTT is further based on at least one first retransmission parameter of the first channel, and
the at least one first retransmission parameter comprises a first retransmission period and a first maximum retransmission number.

18. The method of claim 17, wherein the estimating the first RTT is further based on a first propagation delay of the first channel.

19. A method performed by a common internet protocol anchor communicating with a user equipment through plurality of base stations, the method comprising:
- obtaining a first round trip time (RTT) of a first channel between the user equipment and a first base station among the plurality of base stations;
- obtaining a second RTT of a second channel between the user equipment and a second base station among the plurality of base stations;
- adjustably determining a size of first downlink data based on an estimated value of the first RTT and an estimated value of the second RTT and adjustably determining and a size of second downlink data based on the estimated value of the first RTT and the estimated value of the second RTT;
- providing the first downlink data and the second downlink data to the first base station and the second base station, respectively,
- wherein the first downlink data and the second downlink data are included in downlink data to be transmitted to the user equipment, and
- wherein the first RTT and the second RTT are estimated based on a first block error rate (BLER) of the first channel and a second BLER of the second channel, respectively.

20. The method of claim 19, wherein the obtaining the first RTT comprises:
- receiving first information about the first channel from the first base station; and
- estimating the first RTT based on the first information.

* * * * *